United States Patent
Masinter et al.

(10) Patent No.: US 8,099,445 B1
(45) Date of Patent: *Jan. 17, 2012

(54) FILE DISPATCHER FOR MULTIPLE APPLICATION TARGETS

(75) Inventors: Larry Masinter, Los Altos, CA (US); Roger Webster, San Martin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 817 days.

This patent is subject to a terminal disclaimer.

(21) Appl. No.: 12/177,689

(22) Filed: Jul. 22, 2008

Related U.S. Application Data (63) Continuation of application No. 10/313,246, filed on Dec. 6, 2002, now Pat. No. 7,409,405.

(51) Int. Cl.
*G06F 17/00* (2006.01)
(52) U.S. Cl. ........ 707/822; 707/791; 707/825; 707/796; 707/792
(58) Field of Classification Search .................. 707/791, 707/822, 825, 792, 793, 796
See application file for complete search history.

(56) References Cited

U.S. PATENT DOCUMENTS

| 5,838,906 | A | 11/1998 | Doyle et al. | |
|---|---|---|---|---|
| 7,024,214 | B2* | 4/2006 | Loveland | 455/502 |
| 2002/0105681 | A1* | 8/2002 | Iyoki | 358/442 |
| 2004/0205656 | A1* | 10/2004 | Reulein et al. | 715/530 |
| 2006/0041840 | A1* | 2/2006 | Blair et al. | 715/513 |

OTHER PUBLICATIONS

Capio Corporation, http://www.capio.cc, © 2000-2002, San Jose, CA, 9 pages.

* cited by examiner

*Primary Examiner* — Sana Al Hashemi
(74) *Attorney, Agent, or Firm* — Fish & Richardson P.C.

(57) ABSTRACT

Methods and apparatus, including computer program products, implementing techniques for selecting an application to be used to manipulate a file in a computing environment. The technique includes receiving a request to manipulate a file, the file having a file type, identifying a plurality of applications associated with the file type in the computing environment, and selecting an application from the plurality of applications associated with the file type based at least in part on context information representing a context of the computing environment. Each of the identified plurality of applications associated with the file type are capable of manipulating files of the file type.

42 Claims, 5 Drawing Sheets

FIG. 5 ated with a default application. For example, in a typical
FILE DISPATCHER FOR MULTIPLE APPLICATION TARGETS

CROSS-REFERENCE TO RELATED APPLICATIONS

This application claims the benefit under 35 U.S.C. §120 of U.S. application Ser. No. 10/313,246, filed on Dec. 6, 2002.

BACKGROUND

The present invention relates to manipulating files in a computing environment.

Software applications create and manipulate files. Each file is characterized by a file type, which can be indicated to the operating environment by a file extension or MIME (Multipurpose Internet Mail Extensions) type. For example, TIFF files (Tagged Image File Format) have a MIME type of "image/tiff" and a ".tif" extension, while PDF files (Portable Document Format) have a MIME type of "application/pdf" and a ".pdf" file extension. In addition, some file types have a "magic number": an initial sequence of bytes or data at the beginning of the file which only appears (or is likely to appear) in files of a particular type.

As used in this specification, the term file type can be a complex of different components. File type can include file extension (".pdf"), MIME type or content-type ("application/pdf") and/or "a magic number," a special sequence of bytes that only appear inside files of a particular type. The different ways of indicating or determining file type are usually, but need not, be correlated. For example, a single MIME type can correspond to several file extensions, one file extension can be used by several MIME types, and file type determination by magic number detection is often unreliable.

In many operating environments, file types can be associated with a default application. For example, in a typical computer system installation, Microsoft PowerPoint® software available from Microsoft Corporation of Redmond, Wash. may open PowerPoint files, Adobe® Acrobat® software available from Adobe Systems Incorporated of San Jose, Calif. may open PDF files, etc. In most operating systems, such as the Macintosh® or Windows® environments, users can associate a specified application with a particular file extension or MIME type to make the specified application the default opener for the particular file extension or MIME type. In some cases, operating systems check for a default opener whenever a file is opened. When a default application has been specified, to use any other application to open a file a user must launch the other application separately and select the file from within that application, drag the file icon to the application icon or use another file opening method.

However, many files can be opened by more than one application. For example, files in the PSD format, which is the native file format of the Adobe® Photoshop® graphical editing software, can be opened by both Photoshop® software and Photoshop Elements® software, both available from Adobe Systems Incorporated. Similarly, a variety of different applications, including Adobe® Acrobat® and Acrobat® Reader® software, can open PDF files. Many applications make themselves the default opener for particular file types upon installation, overwriting settings for any previously defined default applications. To restore a previously defined default opener, the user may be required to manually reset the original settings, or even to reinstall the former default application. In some cases, an application checks whenever it is launched to determine if another application has taken its place as the default opener, and changes the settings to reestablish itself as the default opener.

Some file types can be used for multiple purposes. For example, tagged image file format ("TIFF") files, having a MIME type of "image/tiff" and a ".tif" file extension, can be used for photographs and for multipage document images. While different applications might be the best default opener for a given use, only one of these applications can typically be designated as the default opener. The conflicts between competing applications can make it difficult for a user to ensure that the best application will be used to open a selected file. The user might also be unaware what the default opener is for the selected file.

SUMMARY

Methods and computer program products are provided to manipulate a file using an application selected from a plurality of applications capable of manipulating the file.

In general, in one aspect, the invention features methods and apparatus implementing techniques for selecting an application to be used to manipulate a file in a computing environment. The technique includes receiving a request to manipulate a file, the file having a file type, identifying a plurality of applications associated with the file type in the computing environment, and selecting an application from the plurality of applications associated with the file type based at least in part on context information representing a context of the computing environment. Each of the identified plurality of applications associated with the file type are capable of manipulating files of the file type.

Particular implementations can include one or more of the following features. The plurality of applications can be associated with the file type by rules in a set of selection rules defining conditions for selecting an application to be used to manipulate files. The selection rules can include user-defined preferences associating applications with file types and/or administrator preferences applicable to all users of the computing environment. The file type can be represented by a file extension or a MIME type and/or determined by one or more magic numbers associated with the file.

Selecting an application can include using one or more selection rules to select an application based on the context information. The selection rules can include a hierarchy of selection rules, and using the selection rules can include traversing the hierarchy of selection rules based on the context information.

The context information can include application usage information identifying applications currently executing in the computing environment, applications previously used to manipulate the file, applications previously used to manipulate files having the file type, or applications previously used to manipulate files stored in a memory location. The context information can also includes file information identifying a location of the file in the computing environment, file information representing content of the file, and/or rights management information representing usage rights for applications installed in the computing environment. The file information representing content of the file can include metadata extracted from the file.

A subset of the plurality of applications associated with the file type can be identified based on the context information. Selecting an application can include receiving user input selecting an application from the identified subset of applications associated with the file type.

The technique can further include manipulating the file using the selected application. Manipulating the file using the selected application can include manipulating the file using an instance of the selected application running remotely on another computer system. User input overriding a selection of an application from the plurality of applications can be received. The file can be manipulated with an application selected by a user.

The file can be a file in a collection of files, with each of the files in the collection having a file type. Identifying a plurality of applications can include identifying applications associated with the file type of each of the files in the collection of files in the computing environment, where at least one of the file types is associated with a plurality of applications. Selecting an application can include selecting an application from the identified applications for each of the files in the collection. One or more of the applications can be selected based at least in part on context information representing a context of the computing environment.

If the selected application is not installed in the computing environment, the technique can include prompting a user to download the selected application from the Internet and/or downloading the selected application from the Internet.

All or a portion of at least one of the steps of identifying a plurality of applications and selecting an application can be performed at a remote location. The file can also be transmitted to a proxy converter to convert the file to a format that is compatible with an application installed in the computer environment.

The invention can be implemented to realize one or more of the following advantages. Allowing multiple default openers for individual file types eliminates competition among applications to identify themselves as the default opener for a file type. Using context information to select an application to open a particular file ensures that the best application will be useful to open the file.

Different applications can be associated with different actions to be performed upon files of particular types. For example, a first application can be associated with a file type as a "Viewer" for files of the file type, while another application can be associated with the file type as an "Editor" for files of the type. Selection of an application from among multiple applications, to manipulate a file of a particular file type can be based on user actions, such as activation of a "view" or "edit" button or menu item. The selection can also be based on activation of modifier keys (e.g., activation of a "Control" key selects an application in which to edit a file). The association of individual applications as "viewers" and "editors" for a given file type can be changed through a user interface.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
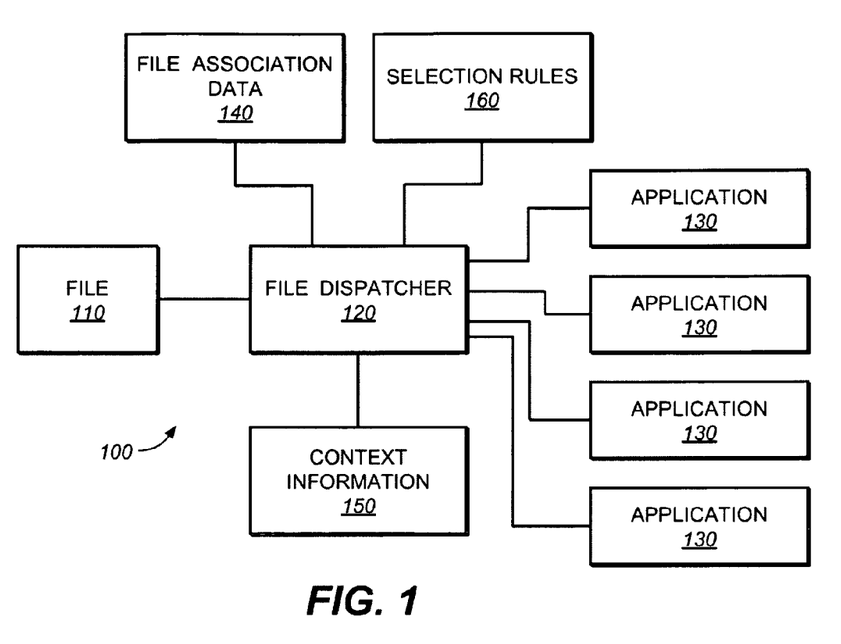
FIG. 1 is a block diagram illustrating an implementation of a file manipulating system.

FIG. 1 is a block diagram illustrating one implementation of a file manipulating system 100 according to one aspect of the invention. The system includes a file 110 to be opened, multiple applications 130, a file dispatcher 120, file association data 140, and context information 150. The file dispatcher 120 uses the file association data 140 and the context information 150 to select, according to selection rules 160, an application to manipulate a file from a plurality of applications capable of manipulating the file.

As used in this specification, a file can include any entity of data that is capable of being manipulated as an entity, including a stream of data bits such as a stream of data that is in the process of being retrieved from a remote location. As used in this specification, "manipulating" a file can include performing any desired action on a file that is dependent on the file's type, such as opening the file for editing or viewing, or converting the file to a file type that is capable of being opened or otherwise manipulated by an application in the computer system. As used in this specification, an application can include a service that is provided remotely.

The components of system 100 can be implemented in a computer system of conventional construction that includes a programmable processor, a memory, input devices, output devices, communications hardware, and the like.

The file dispatcher 120 can be a free standing application, a plug-in, or a component or module of a larger application or of an operating system. The file dispatcher 120 can be installed as the default opener for files having particular file types. The file types can be express, such as indicated by a file extension or MIME type, or inferred, such as indicated based on a magic number or other metadata of the file. In one implementation, the file dispatcher 120 can be installed as part of an application or a set of applications during installation of the application(s). For example, information in the Windows® operating system registry can be updated so that the launch tree points to the file dispatcher 120 as the default application for each file type. Then, instead of setting up file associations in the operating system of the computer, the new application(s) 130 can be added to the file association source 140 associated with the file dispatcher 120.

In implementations in which the file dispatcher 120 is installed as the default file opener, the file dispatcher 120 can be configured to monitor the status of the system (e.g., the system registry) to ensure that the file dispatcher 120 remains the default opener. Some applications 130 can try to override associations. For example, some applications can re-write the registry with original entries. These applications could overwrite updates made by file dispatcher 120. If the file dispatcher 120 determines that it has been replaced as the default opener for one or more file types, it can be configured to reestablish itself as the default opener, for example by rewriting the registry. In one implementation, the file dispatcher 120 can be distributed by a vendor free of charge, and can be configured to coordinate file opening using other products offered by the vendor, and/or to provide users with product information regarding such other products, as will be described in more detail below.

The applications 130 can include all applications available in a computer system, or a subset of applications available in the computer system. For example, the applications 130 can include all of the applications available from a particular vendor that exist in the computer system. The applications 130 can include different applications or different versions of the same application. Thus, different versions of an application can exist on the system 100 at the same time without one version being the default for all files of a certain type. Different applications can be associated with a particular file type for different purposes. For example, a first application can be associated with a file type as a "Viewer" for files of the file type, while another application can be associated with the file type as an "Editor" for files of the type. The choice of which application to use to manipulate a file, or which version of the application, is made by the file dispatcher 120 at runtime on a per file basis. Some or all functions of the file dispatcher 120 can be performed remotely. For example, some functions of the file dispatcher 120 can be performed at a server while other parts are performed locally in the computer system. The file dispatcher 120 selects an application to use to manipulate a file 110 based on file association data 140 and context information 150. File association data 140 includes information associating file types with compatible applications—that is, applications that are capable of manipulating files of the specified file type or types. Thus, for example, the file association data 140 can include a list, table or other data structure correlating file extensions (or MIME types or other indicia of file type) with particular applications installed on the computer system. The file association data 140 can be gathered from a registry associated with the operating system, such as the Windows® operating system's registry, and can be stored in any conventional data store available to the computer system. The file association data 140 can be stored locally. Alternatively, some or all of the file association data 140 can be stored remotely, and accessed by the file dispatcher 120 over a communications connection, such as a local or wide area network, or the Internet. The file dispatcher 120 uses the file association data 140 to identify the applications 130 that can be used to manipulate file 110.

Optionally, the file association data 140 can also include information associating file types with compatible applications that are not installed on the computer system. Thus, the file association data 140 can include information associating a particular file type with a particular application or applications, even if the application is not installed on the computer system. The file association data 140 can include information identifying a location, such as a URL, at which the particular application or applications (or rights to use an already installed application) can be purchased and/or downloaded for installation on the computer system. Thus, for example, when requested to open a file of a particular file type, the file dispatcher 120 can be configured to inform the user that particular uninstalled applications can be used to open the file, even if other, installed applications are available that could be used to open the file. In one implementation, file dispatcher 120 can be configured to automatically navigate a web browser to the specified URL, to provide the user with the opportunity to purchase and/or download the relevant application or applications, or manipulate the file using a version of the relevant application running in a remote location. The user can also be provided with an opportunity to purchase rights to use an application already installed on the computer system. Exemplary techniques for providing application rights are described in U.S. application Ser. No. 10/080,923, "Application Rights Enabling," filed Feb. 21, 2002, which is incorporated by reference herein.

In another implementation, one of the applications included in the file association data 140 can be a proxy converter. If the file association data 140 associates the file type of the file to be opened with compatible applications that are not installed on the computer system, the file dispatcher 120 can be configured to transmit a file of a particular type to a proxy converter. The proxy converter can change the file type of the file to a file type (e.g., by converting the file to a different format) that can be opened by an application that is installed on the computer system. The proxy converter can include a mapping between file types of files received and file types to which to convert each received file. For example, the proxy converter can include a mapping indicating that if a file of type x is received, the file should be converted to a type y, and if a file of type w is received, the file should be converted to a type z.

Some or all of the mapping can be submitted to the proxy converter by the file dispatcher 120 along with a request to convert the format of a file. Thus, if a proxy converter is identified by the file dispatcher 120 as one of the applications capable of manipulating the file type of a particular file, the file dispatcher 120 can select the proxy converter as the application with which to manipulate the file.

The file dispatcher's information can contain a table or data structure representing an association:
   source file type
      address of proxy converter
         possible destination file types that the proxy converter
            can convert to from this kind of source.

That is, the file dispatcher might know about the source file type and the address of the proxy converter, and only ask the proxy converter to convert to one of the file types that are listed and are also available on the file dispatcher's system.

Context information 150 can include a variety of different types of information that can be used by file dispatcher 120 to select an application or applications from the applications identified in file association data 140 as being compatible with a particular file type. Context information 150 can be defined by a user or administrator of the computer system, or it can be automatically generated or otherwise obtained by file dispatcher 120 or the computer system. Context information 150 can be stored in and retrieved from a data store; alternatively, it can be dynamically generated based, for example, on system conditions at the time a request to manipulate a file is received.

Context information 150 can include application usage information. Application usage information can include information identifying applications that are currently executing on the computer system. Thus, when requested to manipulate a file of a particular file type, file dispatcher 120 can be configured to select a compatible application identified in file association data 140 by selecting an identified application that is executing on the computer system at the time of the request.

Similarly, application usage information can also include information identifying applications that have been previously used to manipulate a particular file, files of a particular type, or files stored in a particular location, such as a particular directory of a file system or a particular storage medium. Thus, file dispatcher 120 can be configured to select a compatible application that has previously been used to manipulate the same or similar files on the computer system. Optionally, this information can be specific to a particular user (stored, for example, in a user profile identifying previous actions and preferences of a particular user of the computer system).

Context information 150 can also include rights management information relating to the applications installed on the computer system. Rights management information can include information identifying usage rights applying to the applications installed on the computer system. For example, rights management information can identify license and/or royalty terms that cover particular applications. File dispatcher 120 can use this information, in combination with selection rules, to select, for example, an application that is subject to a paid up license instead of one that requires the payment of a per-use royalty for each use. Similarly, rights management information can identify particular fields of use, or file types, that are included or excluded in usage rights associated with particular applications, such that file dispatcher 120 only selects such applications for uses within the scope of their associated usage rights.

In addition, context information 150 can include file information relating to the file to be manipulated. The file information can include the location of the file, such as a particular directory of a file system or a particular storage medium. File dispatcher 120 can be configured to use this information in combination with application usage information identifying applications previously used to manipulate files in that location to select a compatible application to manipulate a requested file. Thus, for example, file dispatcher 120 can be configured to open a file stored in a "photos" directory using one application, while a file of the same type stored in a "presentations" directory may be opened using a different application.

File information can also include information relating to the contents of the file in question. The contents can include substantive content, such as, for example, whether the data in the file represents a single image or multiple images, such that file dispatcher 120 can be configured to open single image files (which may correspond, for example, to digital photos), with one application, and multi-image files (which might correspond to presentations, electronic books, or the like) with another application. The contents can also include metadata relating to the file and/or its contents. Metadata can include identifying information, such as a magic number of the file. Alternatively, metadata can more broadly refer to any data about the file or its contents. In one implementation, metadata can be defined and/or extracted according to the eXtensible Metadata Platform (XMP), which is a common XML framework developed by Adobe Systems Incorporated that standardizes the creation, processing, and interchange of document metadata across publishing workflows. File dispatcher 120 can be configured to extract specified metadata from the requested file, and to use that metadata (and/or other context information) in the selection of an application to manipulate the file according to selection rules, which will be described below.

Different types of context information can be used together to determine, for example, which other files recently manipulated are most like (in name, content, length, author) the file being manipulated, and what application was used to manipulate the other files.

In one implementation, file dispatcher 120 uses the context information 150 to select an application 130 to manipulate a file 110 according to selection rules 160. The file dispatcher 120 can use the selection rules 160 to determine what criteria to use, and how those criteria are to be applied, to select an application or applications from the compatible applications identified in the file association data 140. The selection rules 160 can include a hierarchy of rules, such as a tree structure, setting priorities of different types of context information 150 to be consulted by file dispatcher 120 in selecting an application 130 to use to manipulate a particular file 110. File dispatcher 120 can traverse the rules hierarchy to identify an applicable selection rule or rules for a particular file 110. The selection rules 160 can be stored in memory—either locally or remotely—and can be predetermined or can be defined at runtime, and can be defined by a user or system administrator, or a combination of these. In one implementation, some or all selection rules to be used in selecting an application to be used to manipulate a file can be provided in or derived from metadata of the file itself. Optionally, file dispatcher 120 can be configured to assign selection rules that are specified by the user, or derived from the file metadata, to a higher position in the rule hierarchy (i.e., to assign a higher priority to metadata-based rules) than rules derived from other sources. A hierarchy of rules can be constructed by organizing the rules into a decision tree instead of a linear list. For example, one rule could be used only used to distinguish image files from text files, and, within that framework, a set of rules can be used that only apply to image files.

Selection rules 160 can include the file association data 140. Additionally, selection rules 160 can include predetermined user or administrator preferences identifying particular applications to be used to manipulate particular file types, files containing particular content (either substantive content or metadata), or the like. Likewise, user or administrator preferences can attach priorities to particular types of context information for particular file types, specifying, for example, that file dispatcher 120 should select an application to manipulate image files by looking first to specified metadata in the files, and then using that metadata to select from compatible applications currently executing on the system. A selection rule based on an administrator preference might specify that file dispatcher 120 should first look to applications bearing no royalty requirements and only then to applications requiring payment of royalties. User or administrator preferences (or other selection rules) can be defined globally for the computer system at any time. Alternatively, such preferences can be input by the user or administrator at the time a file is saved in the system, at the time a new application is added to the system or when the file dispatcher 120 is launched.

Selection rules 160 can also specify that the user should be given a choice of applications 130 for manipulating a file 110 if more than one compatible application is available. For example, file dispatcher 120 can use context information to identify a subset of compatible applications 130 identified in the file association data 140, and the user can be prompted to make the ultimate selection from the identified subset of applications.

Selection rules 160 can include rules operable to select an application based on user actions, such as activation of a "view" or "edit" button or menu item. The selection rules 160 can also include rules to select an application based on activation of modifier keys (e.g., activation of a "Control" key selects an application in which to edit a file). The association of individual applications as "viewers" and "editors" for a given file type can be changed through a user interface.

Selection rules 160 may not be exact transcriptions of user intentions. The selection rules 160 can include heuristics based on experience of the computer system, or of a designer of the selection rules. For example, it might be desirable to have a rule that selects one application for PDF files written in Japanese and another application for PDF files written in English. However, the applicability of this rule for PDF files that are not tagged with the language of the text within them can be determined by a heuristic that looks at, for example, the predominate use of characters in different character repertoires to guess the language of the file.

In one implementation, the file association data 140, context information 150 and/or selection rules 160 can be automatically updated over a network, such as the Internet or a corporate intranet. File dispatcher 120 can be configured so that such automatic updates will not override user- or administrator-defined preferences or associations for a particular file type.

File dispatcher 120, file association data 140, context information 150, selection rules 160 and the applications 130 can exist as separate items so that each can be updated separately. File dispatcher 120 can have separate versions and be updated independently of the applications 130. Updating file dispatcher 120 independently of the file association data 140, context information 150, and selection rules 160 can support consistent file manipulating behavior even when installing old versions of applications 130 alongside new versions. The file association data 140, context information 150, and selection rules 160 can be updated more frequently than file dispatcher 120.

Figure 2:
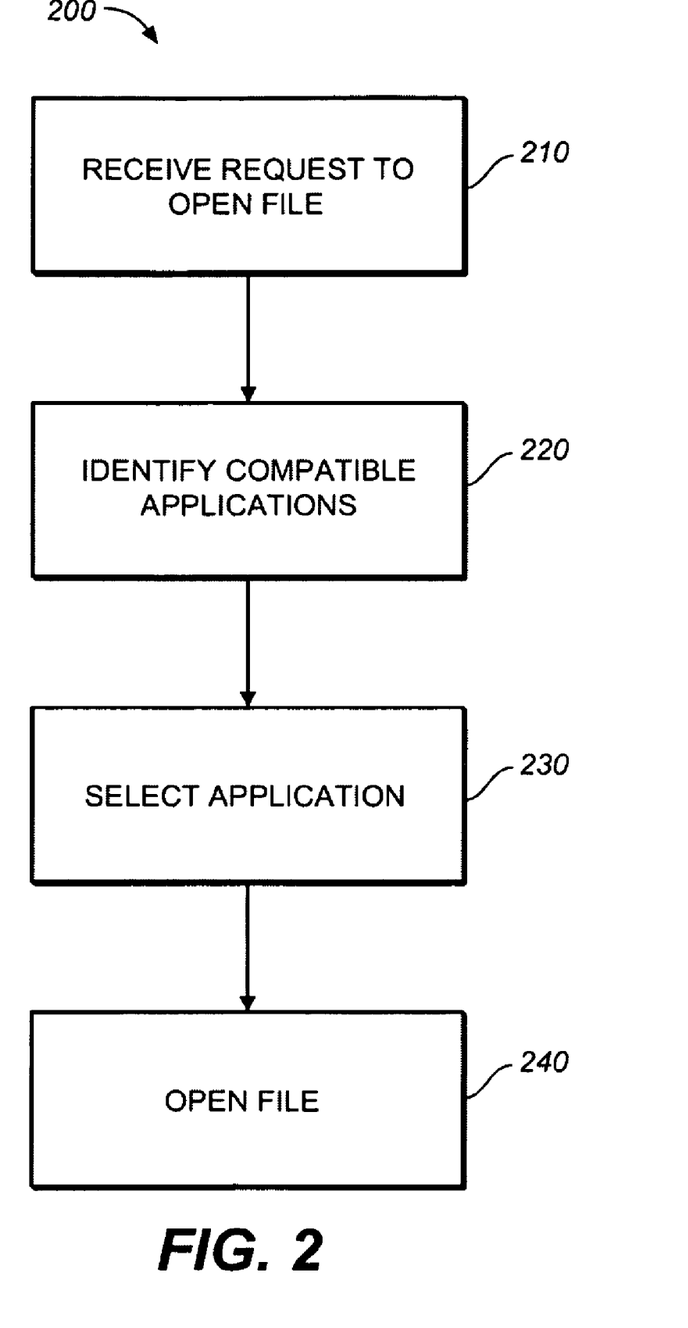
FIG. 2 is a flow diagram illustrating a method of manipulating a file using a file dispatcher.

FIG. 2 is a flow diagram illustrating a method 200 of opening a file using a file dispatcher 120. A file dispatcher 120 receives a request to open a file 110 (step 210). The request can be based, for example, on user input selecting a file to be opened in a folder or directory of a computer system. The file has an associated file type, as described above.

If there is more than one application 130 that is capable of opening files having the file type associated with the file 110, the file dispatcher 120 identifies a plurality of applications 130 that are capable of opening the file (step 220). The file dispatcher 120 can identify compatible files using the file association data 140 as discussed above.

The file dispatcher 120 selects an application 130 with which to open the file 110 (step 230). The file dispatcher 120 selects the application based at least in part on context information 150 as discussed above. As also discussed above, the file dispatcher 120 can make the selection by applying one or more selection rules 160 to the file association data 140 and/or context information 150 to select an appropriate application or applications.

The file dispatcher 120 can use the selection rules 160 and/or the context information 150 automatically to select an application to be used to manipulate the file 110. Alternatively, file dispatcher 120 can be configured to allow the user to select an application to use to open a particular file from a set of available applications 130 that are capable of manipulating files of the same type. The file dispatcher 120 can present the user with a list of available applications 130, and the user can select an application from the list using, e.g., conventional graphical selection techniques. The list of available applications 130 can include all applications accessible to the computer system that are capable of manipulating files having the same type as the particular file, or only a subset of such applications. The subset of applications 130 can be defined by the file dispatcher 120 using context information to narrow the set of available applications 130 just as it would to automatically select one application to open the particular file, as described above.

The file dispatcher 120 can be configured to allow the user to override an automatic selection made by the file dispatcher 120 as described above. After selecting an application to manipulate a particular file, the file dispatcher 120 can identify the selected application to the user (e.g., by causing the computer system to display to the user a dialog identifying the selected application), and give the user the opportunity to override the selection (e.g., by providing an "OK" button and a field in which the user can identify an alternative application to be used to open the file). Alternatively, the file dispatcher 120 can be configured to allow the user to override the file dispatcher's selection process by providing an override input—for example, activating a specified key (control, alt, shift, etc.) at the time the file to be opened is selected.

The file dispatcher 120 can be configured to operate in different modes. In a first, automatic, mode, the file dispatcher 120 is launched when a file is selected for manipulation, and selects the application with which to manipulate the file without further input by the user. In other modes, the file dispatcher 120 can be configured to always ask the user to make the final selection of the application with which to manipulate the file, to ask the user only when there is a potential conflict between two or more files, or when specific file types, directories or applications 130 are involved in the manipulation of a chosen file. The file dispatcher 120 can also be configured to allow applications to be launched for a particular file with preferences automatically set. The preferences can include parameters, data, and environmental variables. For example, file dispatcher 120 can be configured such that an application selected to open a particular file or type of file will do so in a particular operating mode. Similarly, the file dispatcher 120 can be configured such that if a particular file is opened by a particular application, the file dispatcher 120 will also open a particular calibration file for use by a display monitor displaying a representation of the file.

Figure 3:
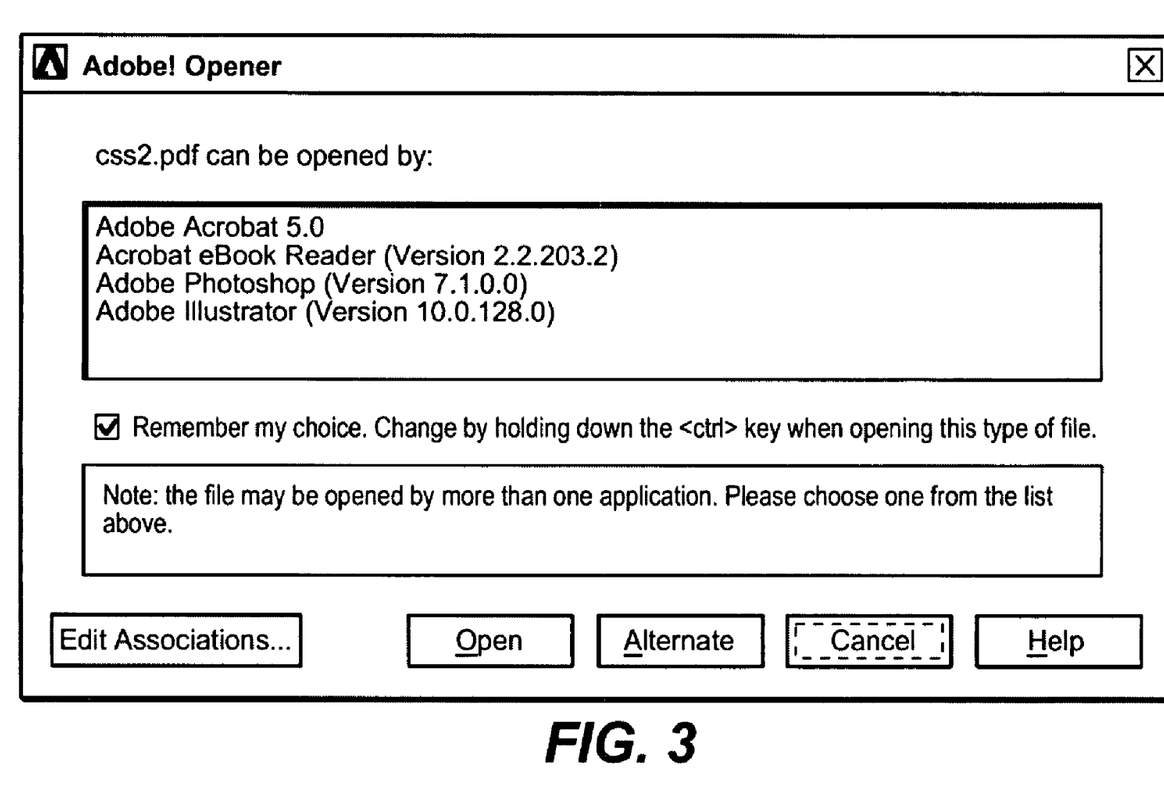
FIG. 3 is a screen shot illustrating a screen allowing selection of files of a file type.

The user can be presented with a user interface ("UI") listing two or more applications 130 that the file dispatcher 120 has identified as being capable of manipulating the file. An example of a UI that can be presented to the user is shown in FIG. 3. The list of applications 130 can be ordered based on context information or selection rules, or the list can include only a subset of the possible candidates for the file type, based on the context information and/or rules. The user can select one of the applications 130 from the list in the UI. The user can be given the option to save the selection of the application (i.e., as a new selection rule 160) for manipulating the file or files having the same file type in the future. The user can also be given the option to edit file type associations.

Figure 4:
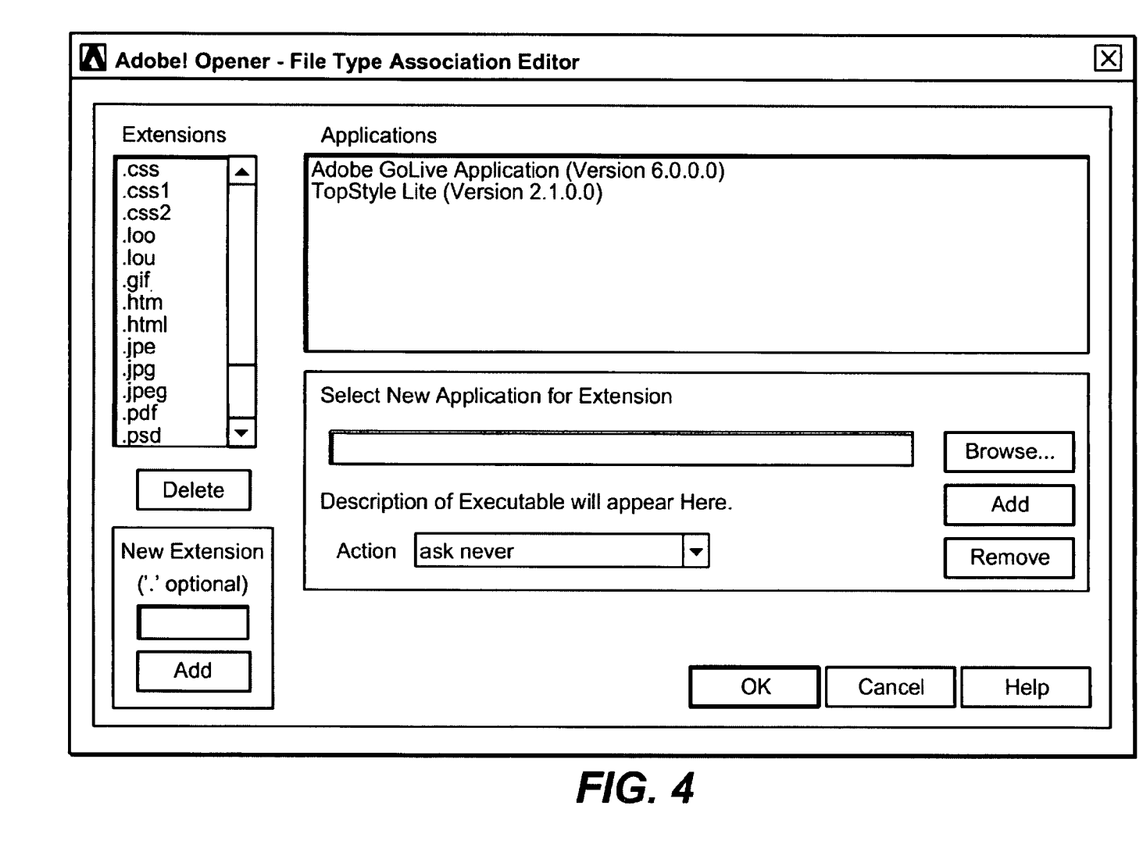
FIG. 4 is a screen shot illustrating a screen for associating applications with a file type.

If the user chooses to edit file type associations, the user can be presented with a UI to edit the applications associated with a particular file type, as shown in FIG. 4. Through the file type association editor UI, the user can select the file type to associate with applications, and associate applications to the file type. The applications can be chosen by browsing through available files in the computing environment.

The file dispatcher 120 opens the file using the selected application (step 240). Optionally, the file dispatcher 120 can provide a preview of the file to the user while the file dispatcher 120 is opening the file. The file dispatcher 120 can load just enough of the file to present the user with the first page, and then launch the selected application.

Figure 5:
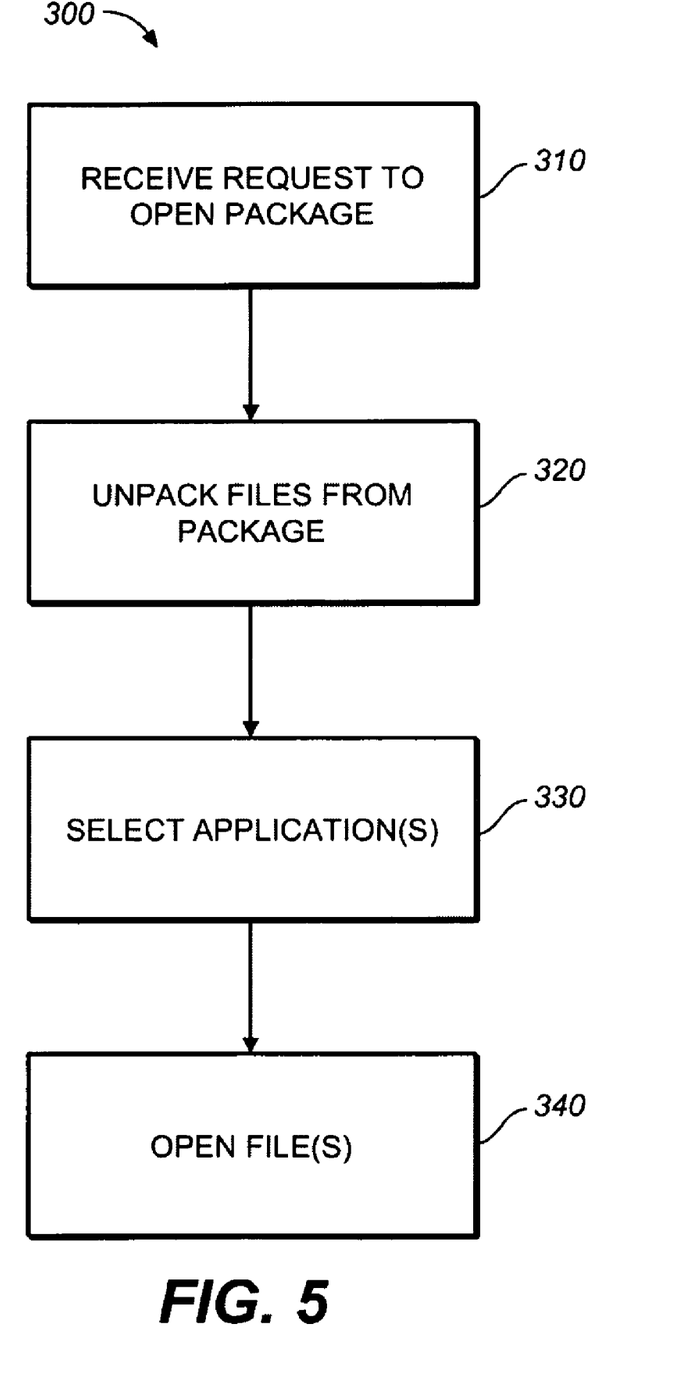
FIG. 5 is a flow diagram illustrating a method of manipulating a file received in a file package using the file dispatcher.

The file 110 can be a file that is part of a package or collection of files that can contain files having different file types. FIG. 5 is a flow diagram illustrating a method 300 of opening a file received in a file package using the file dispatcher 120. The file dispatcher 120 receives a request to launch a package including one or more files 110 (step 310). The package can be a collection of files that is packaged using archiving software, such as WinZip®, available from WinZip Computing, Inc., and sent to a user as a .zip file. The file dispatcher 120 unpacks the individual files from the collection file (step 320), and selects an application for each file 110 to be opened (step 330) using the same techniques described above with reference to step 220. The file dispatcher 120 opens each file 110 using the selected application 130 (step 340), which can be a different application for some or all of the files in the collection.

In one implementation, the file dispatcher 120 can determine, based on the file types of the files 110 in the package, whether to unpack and open the files 110 of the package or to allow another application to unpack and open the files 110.

The file dispatcher 120 can decide to unpack and open the files 110 of the package if the contents of the package would be better handled by one of the file dispatcher's associated applications 130. The file dispatcher 120 can determine the file types of the files in the package, and compare the file types to the file types in the file association data 140. If one of the applications 130 can better handle the files 110 in the package, the file dispatcher 120 itself unpacks the files in the collection. Alternatively, the file dispatcher can unpack the files using a file extraction application such as WinZip.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results. Also, the file dispatcher functionality can be directly integrated into an operating system, such as the Microsoft® Windows® operating system, allowing the decoupling of application launching from a static (or difficult to edit) association between file type and opening application.

What is claimed is:

1. A computer-implemented method comprising:
receiving a package containing multiple files;
receiving a request to open a file of the multiple files, the file having a file type, where the file type identifies a distinct data format of data in files of the file type;
launching a default application for opening files of the file type;
running the default application to identify a plurality of applications in the computing environment that are capable of opening files of the file type, each application in the plurality of applications being associated with the file type based on the file type and file association data;
using the default application to select an application from the plurality of identified applications, the selection of the application being based at least in part on context information; and
launching the selected application to open the file where the action to open the file is dependent on the file type.

2. The method of claim 1, further comprising:
receiving a request to launch the package; and
unpacking each of the multiple files contained in the package.

3. The method of claim 1, where the package is generated using an archiving application.

4. The method of claim 1, where identifying a plurality of applications includes selecting an application for each file of the multiple files contained in the package.

5. The method of claim 1, where the plurality of applications are associated with the file type by rules in a set of selection rules defining conditions for selecting an application to be used to open files.

6. The method of claim 5, where the selection rules include one or more of user-defined preferences associating applications with file types or administrator preferences applicable to all users of the computing environment.

7. The method of claim 1, where the context information includes application usage information identifying applications currently executing in the computing environment, applications previously used to manipulate the file, applications previously used to manipulate files having the file type, or applications previously used to manipulate files stored in a memory location.

8. The method of claim 1, where the context information includes one or more of file information identifying a location of the file in a file system in the computing environment, where the file information is used to identify applications previously run to open files at the location, file information representing content of the file, or rights management information representing usage rights defining scope of use for applications installed in the computing environment.

9. The method of claim 1, where selecting an application includes using one or more selection rules to select an application based on the context information.

10. The method of claim 1, further comprising:
identifying, based on the context information, a subset of the plurality of applications associated with the file type;

where selecting an application includes receiving user input selecting an application from the identified subset of applications associated with the file type.

11. The method of claim 1, further comprising:
determining that the selected application is not installed in the computing environment; and
prompting a user to download the selected application to the computing environment from the Internet.

12. The method of claim 1, further comprising:
determining that the selected application is not installed in the computing environment; and
downloading the selected application to the computing environment from the Internet.

13. A computer program product on a computer-readable medium, the product comprising instructions operable to cause a computer system to:
receive a package containing multiple files;
receive a request to open a file of the multiple files, the file having a file type, where the file type identifies a distinct data format of data in files of the file type;
launch a default application for opening files of the file type;
run the default application to identify a plurality of applications in the computing environment that are capable of opening files of the file type, each application in the plurality of applications being associated with the file type based on the file type and file association data;
use the default application to select an application from the plurality of identified applications, the selection of the application being based at least in part on context information; and
launching the selected application to open the file where the action to open the file is dependent on the file type.

14. The computer program product of claim 13, where the instructions are further operable to cause a computer system to:
receive a request to launch the package; and
unpack each of the multiple files contained in the package.

15. The computer program product of claim 13, where the package is generated using an archiving application.

16. The computer program product of claim 13, where the instructions to identify a plurality of applications include instructions to select an application for each file of the multiple files contained in the package.

17. The computer program product of claim 13, where the plurality of applications are associated with the file type by rules in a set of selection rules defining conditions for selecting an application to be used to open files.

18. The computer program product of claim 17, where the selection rules include one or more of user-defined preferences associating applications with file types or administrator preferences applicable to all users of the computing environment.

19. The computer program product of claim 13, where the context information includes application usage information identifying applications currently executing in the computing environment, applications previously used to manipulate the file, applications previously used to manipulate files having the file type, or applications previously used to manipulate files stored in a memory location.

20. The computer program product of claim 13, where the context information includes one or more of file information identifying a location of the file in the computer system, where the file information is used to identify applications previously run to open files at the location, file information representing content of the file, or rights management information representing usage rights defining scope of use for applications installed in the computing environment.

21. The computer program product of claim 13, where the instructions operable to cause a computer system to select an application include instructions to use one or more selection rules to select an application based on the context information.

22. The computer program product of claim 13, further comprising instructions operable to cause a computer system to:
identify, based on the context information, a subset of the plurality of applications associated with the file type;
where the instructions operable to cause a computer system to select an application include instructions operable to cause the computer system to receive user input selecting an application from the identified subset of applications associated with the file type.

23. The computer program of claim 13, further comprising instructions operable to cause a computer system to:
determine that the selected application is not installed in the computing environment; and
prompt a user to download the selected application to the computing environment from the Internet.

24. The computer program of claim 13, further comprising instructions operable to cause a computer system to:
determine that the selected application is not installed in the computing environment; and
download the selected application to the computing environment from the Internet.

25. A system comprising:
a processor; and
a memory for storing instructions, which when executed by the processor, causes the processor to perform operations comprising:
receiving a request to open a file, the file having a file type, where the file type identifies a distinct data format of data in files of the file type;
launching a default application for opening files of the file type;
running the default application to identify a plurality of applications in the computing environment that are capable of opening files of the file type, each application in the plurality of applications being associated with the file type based on the file type and file association data;
using the default application to select an application from the plurality of identified applications, the selection of the application being based at least in part on context information; and
launching the selected application to open the file where the action to open the file is dependent on the file type.

26. The system of claim 25, further comprising instructions to perform operations including:
receiving a request to launch the package; and
unpacking each of the multiple files contained in the package.

27. The system of claim 25, where the package is generated using an archiving application.

28. The system of claim 25, where the instructions to identify a plurality of applications include instructions to select an application for each file of the multiple files contained in the package.

29. The system of claim 25, where the plurality of applications are associated with the file type by rules in a set of selection rules defining conditions for selecting an application to be used to open files.

30. The system of claim 29, where the selection rules include one or more of user-defined preferences associating applications with file types or administrator preferences applicable to all users of the computing environment.

31. The system of claim 25, where the context information includes application usage information identifying applications currently executing in the computing environment, applications previously used to manipulate the file, applications previously used to manipulate files having the file type, or applications previously used to manipulate files stored in a memory location.

32. The system of claim 25, where the context information includes one or more of file information identifying a location of the file in a file system in the computing environment, where the file information is used to identify applications previously run to open files at the location, file information representing content of the file, or rights management information representing usage rights defining scope of use for applications installed in the computing environment.

33. The system of claim 25, where selecting an application includes using one or more selection rules to select an application based on the context information.

34. The system of claim 25, further comprising instructions that cause the processor to perform operations including:
identifying, based on the context information, a subset of the plurality of applications associated with the file type;
where selecting an application includes receiving user input selecting an application from the identified subset of applications associated with the file type.

35. The system of claim 25, further comprising instructions that cause the processor to perform operations including:
determining that the selected application is not installed in the computing environment; and
prompting a user to download the selected application to the computing environment from the Internet.

36. The system of claim 25, further comprising instructions that cause the processor to perform operations including:
determining that the selected application is not installed in the computing environment; and
downloading the selected application to the computing environment from the Internet.

37. A method comprising:
receiving a package containing multiple files, each file having a file type, where the file type identifies a distinct data format of data in files of the file type;
receiving a request to launch the package;
unpacking each file of the multiple files contained in the package;
selecting an application for each of the multiple files including a first application for a first file of the multiple files;
receiving a request to open the first file of the multiple files, the first file having a file type, where the file type identifies a distinct data format of data in files of the file type; and
launching the first application to open the first file.

38. The method of claim 37, where selecting an application for each of the multiple files further comprising:
running a default application to identify a plurality of applications in a computing environment that are capable of opening files of one or more file types of the multiple files, each application in the plurality of applications being associated with one or more file types of the multiple files based on the file type and file association data; and
using the default application to select a particular application from the plurality of identified applications for each file of the multiple files, the selection of the application being based at least in part on context information.

39. A computer program product on a computer-readable medium, the product comprising instructions operable to cause a computer system to perform operations including:
receiving a package containing multiple files, each file having a file type, where the file type identifies a distinct data format of data in files of the file type;
receiving a request to launch the package;
unpacking each file of the multiple files contained in the package;
selecting an application for each of the multiple files including a first application for a first file of the multiple files;
receiving a request to open the first file of the multiple files, the first file having a file type, where the file type identifies a distinct data format of data in files of the file type; and
launching the first application to open the first file.

40. The computer program product of claim 39, where selecting an application for each of the multiple files further comprising:
running a default application to identify a plurality of applications in a computing environment that are capable of opening files of one or more file types of the multiple files, each application in the plurality of applications being associated with one or more file types of the multiple files based on the file type and file association data; and
using the default application to select a particular application from the plurality of identified applications for each file of the multiple files, the selection of the application being based at least in part on context information.

41. A system comprising:
a processor; and
a memory for storing instructions, which when executed by the processor, causes the processor to perform operations comprising:
receiving a package containing multiple files, each file having a file type, where the file type identifies a distinct data format of data in files of the file type;
receiving a request to launch the package;
unpacking each file of the multiple files contained in the package;
selecting an application for each of the multiple files including a first application for a first file of the multiple files;
receiving a request to open the first file of the multiple files, the first file having a file type, where the file type identifies a distinct data format of data in files of the file type; and
launching the first application to open the first file.

42. The system of claim 41, further comprising instructions causing a processor to perform operations including:
running a default application to identify a plurality of applications in a computing environment that are capable of opening files of one or more file types of the multiple files, each application in the plurality of applications being associated with one or more file types of the multiple files based on the file type and file association data; and
using the default application to select a particular application from the plurality of identified applications for each file of the multiple files, the selection of the application being based at least in part on context information.

* * * * *